(12) United States Patent
Earl et al.

(10) Patent No.: US 10,169,380 B1
(45) Date of Patent: Jan. 1, 2019

(54) UNIVERSAL DATABASE IMPORT PLATFORM

(71) Applicant: Sprint Communications Company L.P., Overland Park, KS (US)

(72) Inventors: Bryson Earl, Altamonte Springs, FL (US); Seth T. Shelnutt, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 605 days.

(21) Appl. No.: 14/876,732

(22) Filed: Oct. 6, 2015

(51) Int. Cl.
*G06F 7/00* (2006.01)
*G06F 17/30* (2006.01)

(52) U.S. Cl.
CPC ...... *G06F 17/303* (2013.01); *G06F 17/30292* (2013.01)

(58) Field of Classification Search
CPC .......................... G06F 17/303; G06F 17/30292
USPC ........................................................ 707/809
See application file for complete search history.

(56) References Cited

U.S. PATENT DOCUMENTS

| 6,691,116 | B1 * | 2/2004 | Bart | G06F 17/30569 |
| 2010/0325381 | A1 * | 12/2010 | Heim | G06F 9/455 711/170 |
| 2013/0173539 | A1 * | 7/2013 | Gilder | G06F 17/30578 707/622 |
| 2015/0381409 | A1 * | 12/2015 | Margalit | H04L 41/0631 709/221 |
| 2016/0078048 | A1 * | 3/2016 | Balakrishnan | G06F 17/30265 707/821 |

* cited by examiner

*Primary Examiner* — Binh V Ho (57) ABSTRACT

A method of importing data from a plurality of databases of various types. The method comprises aggregating data from the plurality of databases to a centralized database without copying data to outside the memory of the plurality of databases and the centralized database based on a predefined period of time, and importing the aggregated data from the plurality of databases, wherein data is translated from schemas of the plurality of databases to a universal schema of the centralized database. The method further comprises adjusting memory usage of each of the plurality of databases by the centralized database based on a predefined memory threshold for each of the plurality of databases, whereby memory thresholds of the plurality of databases are not exceeded.

20 Claims, 5 Drawing Sheets

UNIVERSAL DATABASE IMPORT PLATFORM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network capable electronic devices are becoming increasingly prevalent in our daily lives. Additionally, more and more electronic devices that did not have network capabilities are becoming network capable. With the rapid development and popularization of network capable electronic devices, communications service providers are expected to achieve reliable delivery of information to customers. Thus, communications service providers desire better understanding and processing of state and performance information of network elements that constitute communications networks. Since a communications network supported by a communications service provider may comprise network elements or network devices manufactured and maintained by different entities, state and performance information of these network elements may be in a variety of formats.

SUMMARY

In an embodiment, a method of importing data from a plurality of databases of various types is disclosed. The method comprises aggregating data from the plurality of databases to a centralized database without copying data to outside the memory of the plurality of databases and the centralized database based on a predefined period of time, importing the aggregated data from the plurality of databases, wherein data is translated from schemas of the plurality of databases to a universal schema of the centralized database, and adjusting memory usage of each of the plurality of databases based on a predefined memory threshold for each of the plurality of databases, whereby memory thresholds of the plurality of databases are not exceeded. The method further comprises storing time zone and date format information associated with each of the plurality of databases, wherein the time zone and date format information is utilized to convert time and date stamps of the associated data to a universal time and date format under predefined circumstances and generating the centralized database based on the imported data with the universal time and date stamps.

In an embodiment, a system for importing data from a plurality of databases of various types is disclosed. The system comprises a non-transitory memory, a processor, and an application stored in the memory. When executed by the processor, the application automatically decides a time to aggregate data at a database, invokes application programming interfaces associated with the plurality of databases to aggregate data at the plurality of databases at determined times, and imports the aggregated data from the plurality of databases, wherein data is translated from schemas of the plurality of databases to a universal schema of a centralized database. The application further transmits queries to a first database among the plurality of databases for information on a first memory limit of the first database, transmits queries to a second database among the plurality of databases for information on a second memory limit of the second database, and adjusts memory usage of the first database by the centralized database by adjusting the volume of data exported from the first database at a time, whereby the first memory limit of the first database is not exceeded. The application further adjusts memory usage of the second database by the centralized database by adjusting the volume of data exported from the second database at a time, whereby the second memory limit of the second database is not exceeded, stores time zone and date format information associated with each of the plurality of databases, wherein the time zone and date format information is utilized to convert time and date stamps of the associated data to a universal time and date format under predefined circumstances, and generates the centralized database based on the imported data with the universal time and date stamps.

In an embodiment, a method of importing data from a plurality of databases of various types is disclosed. The method comprises detecting a database type for each of the plurality of databases, aggregating data at the plurality of databases based on the type of database and a predefined period of time, and importing the aggregated data from the plurality of databases, wherein data is translated from schemas of the plurality of databases to a universal schema of a centralized database. The method further comprises transmitting queries to a first database among the plurality of databases for information on a first memory limit of the first database, transmitting queries to a second database among the plurality of databases for information on a second memory limit of the second database, and adjusting memory usage of the first database by adjusting the volume of data exported from the first database at a time, whereby the first memory limit of the first database is not exceeded. The method further comprises adjusting memory usage of the second database by adjusting the volume of data exported from the second database at a time, whereby the second memory limit of the second database is not exceeded, and generating the centralized database based on the imported data.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network elements or network devices that constitute a communications network may be managed by equipment provided third parties such as a network device manufacturer or a network activity management company other than a communications service provider that provides communications services to end users. In other words, element management systems (EMSs) that monitor and/or manage communication networks may be provided by these third parties and used by communication service providers to monitor and manage the network infrastructure. Data associated with state and performance information of these network elements may also be managed and/or stored by these third parties in a variety of types of databases. When the communications service provider desires to import the data from different network elements, the data may be imported from a variety of types of databases. However, the communications service provider may encounter various challenges especially in automation when data is imported from a variety of types of databases. For example, different databases may include different drivers, schemas, time and date formats, memory limitations, etc.

Specifically, it is easy to overload the databases while importing data from them. It may thus be helpful to set query data limits for importing data at a time from individual databases to avoid overloading the databases. It may even be more beneficial to tune the query data limits for individual databases based on availability. Additionally, use of scripts on databases may enhance the data importing process by further reducing memory use by processor since scripts may process data in memory of databases directly without having to transfer data to outside the associated databases. It is also found that importing larger chunks of data (i.e., data aggregation) results in ability to avoid records for intermediate changes—further reducing volume of processing and transmission. Data from various databases may cause time disambiguating in both date/time format and local time of the timestamps. Working with time conversion not only helps insure alignment of data for transmission but also aligned-results in a centralized database for imported and aggregated data. The present disclosure teaches a universal system and method for importing data from various types of databases.

For example, an application may be stored in a memory of the universal database import system. When executed by a processor of the system, the application may detect a database type for each of a plurality of databases from different third parties. Some major types of database may include Mysql, PostgreSQL, MSSQL, and OracleDB. Besides the above four major types of databases, other types of databases or database data structures may include MariaDB, Netezza, CSV files, Excel files, Teradata, and Hadoop (Hive)—these and other non-major types of databases may be based on the four major types and may have similar string notations, string manipulation functions, etc. with the four major types. Available functions such as application programming interfaces (APIs) associated with the databases may be determined by the application based on the type of a database. The available APIs may be invoked by the application under predefined circumstances, for instance to aggregate data at the databases. The application may automatically determine a time to aggregate data based on predefined rules.

For example, data may be aggregated or assembled at a predefined interval and data changes from last aggregation may be collected. In other words, data changes between two intervals may be ignored. Data aggregation may be based on a column or key of the corresponding database, for example a predefined period of time, a data source network element, or another column or key. By aggregating data based on a period of time, network resources may be saved when importing data since changes of data in a finer granularity than the aggregation interval may be ignored. For example, a database may refresh its data every minute while data may be aggregated and imported by the application every hour.

The aggregated data may then be imported from the plurality of databases. When imported, the data may be translated from schemas of the source databases to a universal schema of a centralized database. A database schema is typically the definition that describes the entire configuration of the database, including all of its tables, relations, index, keys, field value formats, data types, etc. In other words, a database schema is a way to logically group objects such as tables, views, stored procedures etc. The schema translation may be automatic and may be performed through corresponding drivers of the databases. The schema translation may comprise worst case scenarios. For example, the schema translation may comprise as many types of schemas as possible.

In order not to exceed memory limitations of remote databases when executing commands on those databases (e.g., on a server computer mediating access to mass storage devices forming a database), queries may be transmitted to different databases for information on a memory usage limit on the databases for the centralized database or the application to import data from the database. The memory usage limit on a database may be proportional to a memory of the operating system of the database. Alternatively, a specific memory limit may be set on each database for the centralized database to import data. Memory usage of the remote databases by the centralized database to import data may be adjusted, for example by adjusting the volume of data exported from a specific database at a time so that the memory limit of the database is not exceeded.

Time zone and date format information associated with each of the databases may be stored by the application. The time zone and date format information may be input by corresponding personnel or may be detected and/or determined by the application. The time zone and date format information may be utilized to convert time and date stamps of the associated data to a universal time and date format under predefined circumstances. In an embodiment, a time/date parser may perform this time and date conversion. The centralized database may be generated based on the imported data and the normalized time and date.

When an automatic command is run, a configuration file for objects may be generated. Only a source database or a from database, a destination database or a to database, a source table or a from table, and a destination table or a to table may be input by a system administrator, and the rest of objects may be configured by the configuration table. Alternatively, objects may be manually configured. Scripts may be utilized to perform a variety of functions in the process of data import. For instance, scripts may be called by the application to perform a variety of functions to import data. Scripts may save time when aggregating data since they process data in memory of databases directly without having to transfer data to outside the associated databases. In an embodiment, the source database and destination database may be configured as different tables in one database, and thus the data aggregation may be performed without transferring data to outside the databases. The universal data import system is universal because it is modular—only minor changes need to be made for the universal data import system to work with different types of databases or data structures.

Figure 1:
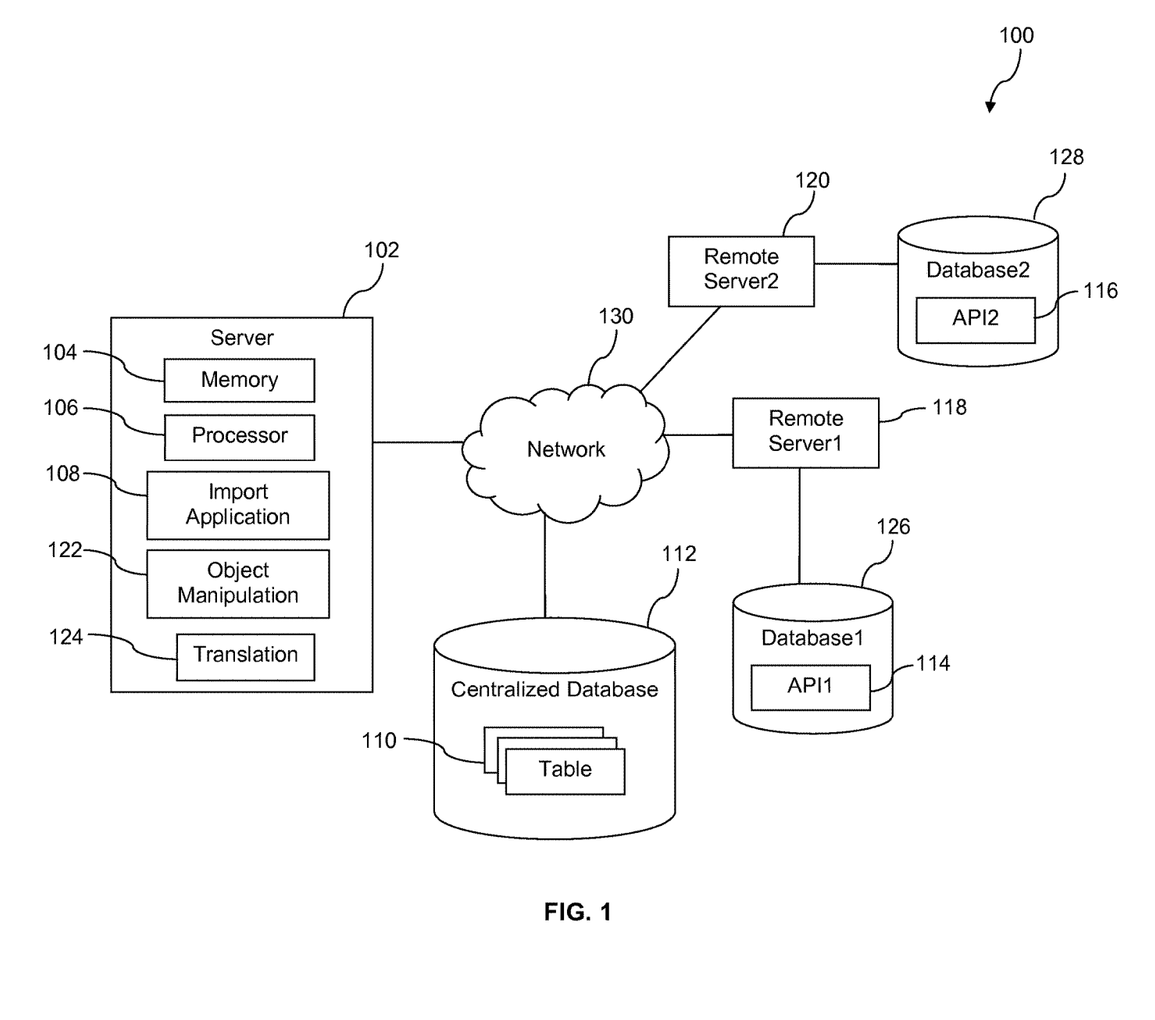
FIG. 1 is an illustration of a communication system according to an embodiment of the disclosure.

Turning now to FIG. 1, a communication system 100 is described. In an embodiment, the communication system 100 comprises a plurality of remote servers 118-120, a plurality of databases 126-128, a server 102, and a centralized database 112. The server 102 may comprise a memory 104, a processor 106, an import application 108, an object manipulation script 122, and a translation script 124. A script is a program or sequence of instructions that is interpreted or carried out by another program rather than by a processor, for example as compared to a compiled program. Scripting languages that support scripts comprise Perl, REXX, JavaScript, Tcl/Tk, Python, Erlang, etc.

The database1 126 may comprise at least one application programming interface (API) 114 and tables (not shown). Similarly, the database2 128 may comprise at least one API2 116 and tables (not shown). The centralized database 112 may comprise at least one table 110. Data stored in these tables may be stored in another data structure, for example flat files, linked lists, or some other type of data structure. The centralized database 112 may be maintained by the server 102. The remote database1 126 may be maintained by the remote server1 118 and the remote database2 128 may be maintained by the remote server2 120. The server 102 and the centralized database 112 may be communicatively coupled to a network 130 via a wireless or wired communication link. The remote server1 118, the database1 126, the remote server2 120, and the database2 128 may also be communicatively coupled to the network 130. The network 130 may comprise any combination of private and public networks.

It is understood that the system 100 may comprise any number of remote servers 118-120, any number of databases 126-128, any number of centralized databases 112, and any number of servers 102. The server 102, the remote server 118/120, the centralized database 112, and the database 126/128 may be server computers. The remote server1 118 and the database1 126 may locate in one computer—for example a server computer, in two different computers—for example, a server computer for the remote server1 118 and another computer for the database1 126, in multiple different computers—for example, multiple server computers for the remote server1 118 and other multiple computers for the database1 126, or in some other combination of computers. When the remote server1 118 and the database1 126 do not locate in one computer, the remote server1 118 and the database1 126 may share the same wired or wireless local area network. It is similar with the server 102 and the centralized database 112 and the remote servers 120 and the database2 128.

The import application 108 may be stored in the memory 104 of the server 102. When executed by the processor 106 of the server 102, the import application 108 may perform a variety of functionality to import data from databases 126-128. In an embodiment, the import application 108 may detect a type for a remote database, determine available functions associated with the type of database, invoke corresponding functions to aggregate data before importing data, import the aggregated data, adjust memory usage of remote databases by the centralized database 112 to import data, store time zone and date format information of associated databases, normalize database schemas, and/or generate a centralized database.

Alternatively, the import application 108 may call scripts such as the object manipulation script 122, the translation script 124, or another script to perform various functions to import data from a variety of types of databases 126-128. Other scripts may also execute on the processor 106. Logic in the scripts could be implemented in software or firmware. For example, logic implemented in the scripts may be implemented in compiled programs in a variety of programming languages (e.g. C, C++, Java).

For example, the import application 108 or the object manipulation script 122 may detect a database type for each of the databases 126-128. Some major types of database may include Mysql, PostgreSQL, MSSQL, and OracleDB. In an embodiment, the database1 126 and the database2 128 may be of different database types. For example, the database1 126 may a Mysql database and the database2 128 may be a MSSQL database. Besides the above four major types of databases, other types of databases or database data structures may include MariaDB, Netezza, CSV files, Excel files, Teradata, and Hadoop (Hive)—these and other non-major types of databases or data structures may be based on the four major types and may have similar string notations, string manipulation functions, or other similarities to the associated major type of database.

Available functions such as APIs 114-116 associated with the databases 126-128 may be determined by the import application 108, for example based on the type of the database. The determined APIs 114-116 may be invoked by the import application 108 under predefined circumstances, for example to aggregate data at a source database 126/128 before importing the data to the centralized database 112 or a destination database 128/126. The data aggregation may be based on a column or key of the source database or a source table, for example a predefined time period, a source network element, or some other column or key. The import application 108 may automatically determine a time to aggregate data based on predefined rules. For example, the import application 108 may decide to aggregate data at the database1 126 every two hours based on the importance of data associated with the database1 126 while data is refreshed every minute at the database1 126. By aggregating data based on a period of time, network resources may be saved when data is imported.

Alternatively, scripts may be called by the import application 108 to aggregate data from the databases 126-128. Using a script may be time efficient in aggregating data since the script may aggregate data in memory of a source database and/or a destination database directly without transferring the data to outside the source database and/or the destination database. In other words, the script may not transfer the data that is to be aggregated to an external memory outside the source database and/or the destination database to aggregate the data. In an embodiment, the source database 126/128 and destination database 128/126 may be configured as different tables in one database, and thus data aggregation may be performed without transferring data to outside the memory of the databases 126-128. The script may be configured to set a time for data aggregation or to determine a time for data aggregation.

The aggregated data may be imported from the databases 126-128. The data may be translated by the import application 108 or the translation script 124 from schemas of the source databases 126-128 to a universal schema of the centralized database 112 when imported. A database schema is typically the definition that describes the entire configuration of the database, including all of its tables, relations, index, etc. In other words, a database schema is a way to logically group objects such as tables, views, stored procedures etc. The schema translation process may be automatic and may be performed through corresponding drivers of the databases 126-128. The schema translation may comprise as many cases as possible. For example, the schema translation may comprise as many types of schemas as possible. To be more specific, the schema translation may comprise 20 different data types, floating point numbers of length 40, etc.

The import application 108 may use memory of the remote databases 126-128 conservatively and may avoid exceeding memory limits of the remote databases 126-128 when importing data from the remote databases 126-128. Memory limits may be set and/or obtained in a variety of ways. A memory limit may be set for a specific database, in this case the centralized database 112, to export data from a source database 126/128. The memory usage limit on the source database 126/128 for the centralized database 112 may be proportional to a memory of the operating system of the source database 126/128.

Alternatively, queries may be transmitted by the server 102, the import application 108, or some script called by the import application 108 for information on a memory usage limit on the database 126/128 for the centralized database 112 to import data from the database 126/128. For example, queries may be transmitted by the import application 108 to the databases 126-128 or the remote servers 118-120 for information on individual memory limits of the databases 126-128. For instance, a first query may be transmitted to the database1 126 for information on a first memory limit for importing data from the database1 126 by the server 102, and a second query may be transmitted to the database2 128 for information on a second memory limit for importing data from the database2 128 by the server 102. Another destination database or server may correspond to a third memory limit with the database1 126 when the destination database imports data from the database1 126. The first memory limit for exporting data from the database1 126 by the server 102 may be different from the third memory limit.

Memory usage of the databases 126-128 may be adjusted by the import application 108, for example by adjusting the volume of data exported from a specific database 126/128 at a time so that the memory limit of the database 126/128 is not exceeded. The memory adjustment may be performed based on memory limits set or obtained for the databases 126-128, as discussed above.

Time and date format information associated with each of the databases 126-128 may be stored by the import application 108. For example, the time zone and date format information may be input by corresponding personnel. Alternatively, the time zone and date format information may be detected and/or determined by the import application 108. In an embodiment, the time zone of a database 126/128 may be detected by the import application 108, and the date format may be determined by the import application 108 based on the time zone information. The time zone and date format information may be stored by the import application 108, for example into a corresponding column of a table 110 associated with the database 126/128 in the centralized database 112. The time zone and date format information may be utilized to convert time and date stamps of data from the associated database 126/128 to a universal time and date format under predefined circumstances. In an embodiment, a time/date parser may perform this time and date conversion and generate normalized time and date.

In an embodiment, when an automatic command is run, a configuration file for objects may be generated. Only a source database, a destination database, a source table, and a destination table may be input by a system administrator, and the rest of objects may be configured by the configuration table. Alternatively, objects may be manually configured. The centralized database 112 may be generated based on the imported data and the normalized time and date.

Figure 2A:
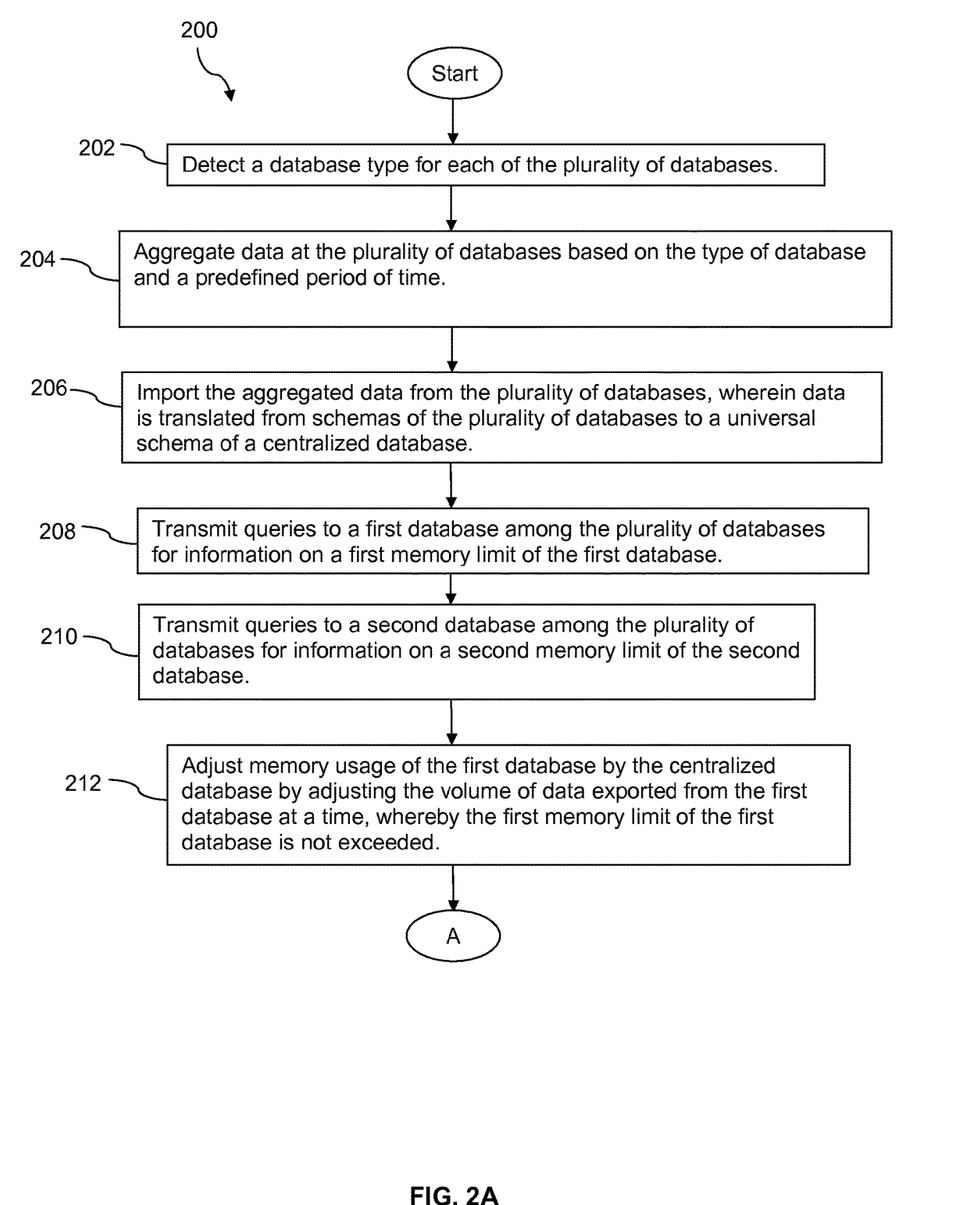
FIGS. 2A and 2B is a flow chart illustrating a method according to an embodiment of the disclosure.

Turning now to FIG. 2, a method 200 is described. At block 202, a database type is detected for each of the plurality of databases. For example, a database type may be detected by the import application 108 for the remote databases 126-128. At block 204, data is aggregate at the plurality of databases based on the type of database and a predefined period of time. For example, the API1 114 associated with the database1 126 may be invoked by the import application 108 to aggregate data based on the type of the database1 126 and a predefined period of time in the case where the data is configured to be aggregated based on time periods. At block 206, the aggregated data is imported from the plurality of databases 126-128, wherein data is translated from schemas of the plurality of databases 126-128 to a universal schema of a centralized database 112.

At block 208, queries are transmitted to a first database among the plurality of databases for information on a first memory limit of the first database. At block 210, queries are transmitted to a second database among the plurality of databases for information on a second memory limit of the second database. At block 212, memory usage of the first database by the centralized database 112 is adjusted by adjusting the volume of data exported from the first database at a time, whereby the first memory limit of the first database is not exceeded.

Figure 2B:
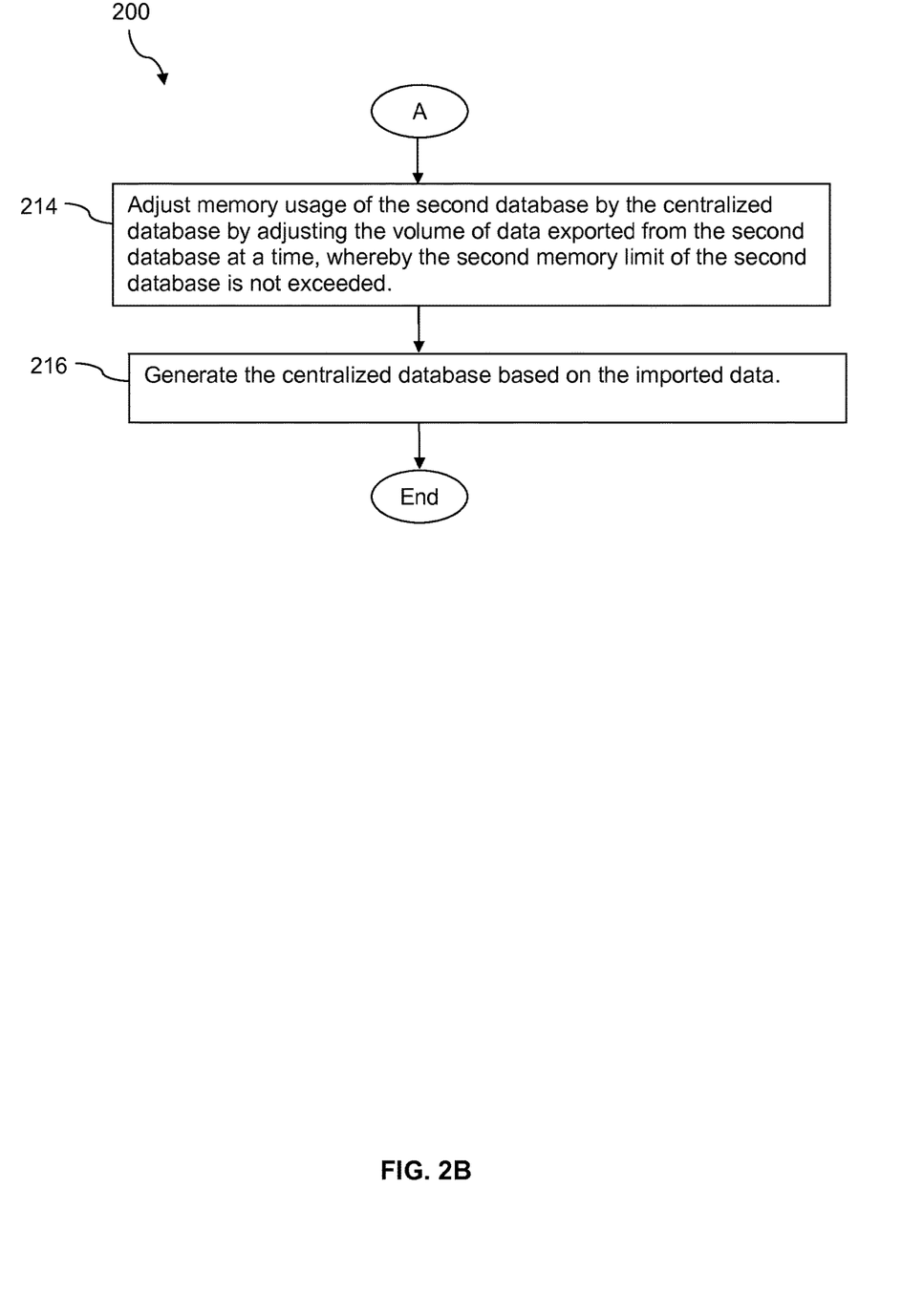

At block 214, memory usage of the second database by requests or instructions executing in the second database (e.g., a remote server mediating access to mass storage of the second database) to read data that is populated into the centralized database 112 is adjusted by adjusting the volume of data exported from the second database at a time, whereby the second memory limit of the second database is not exceeded. At block 216, the centralized database 112 is generated based on the imported data.

Figure 3:
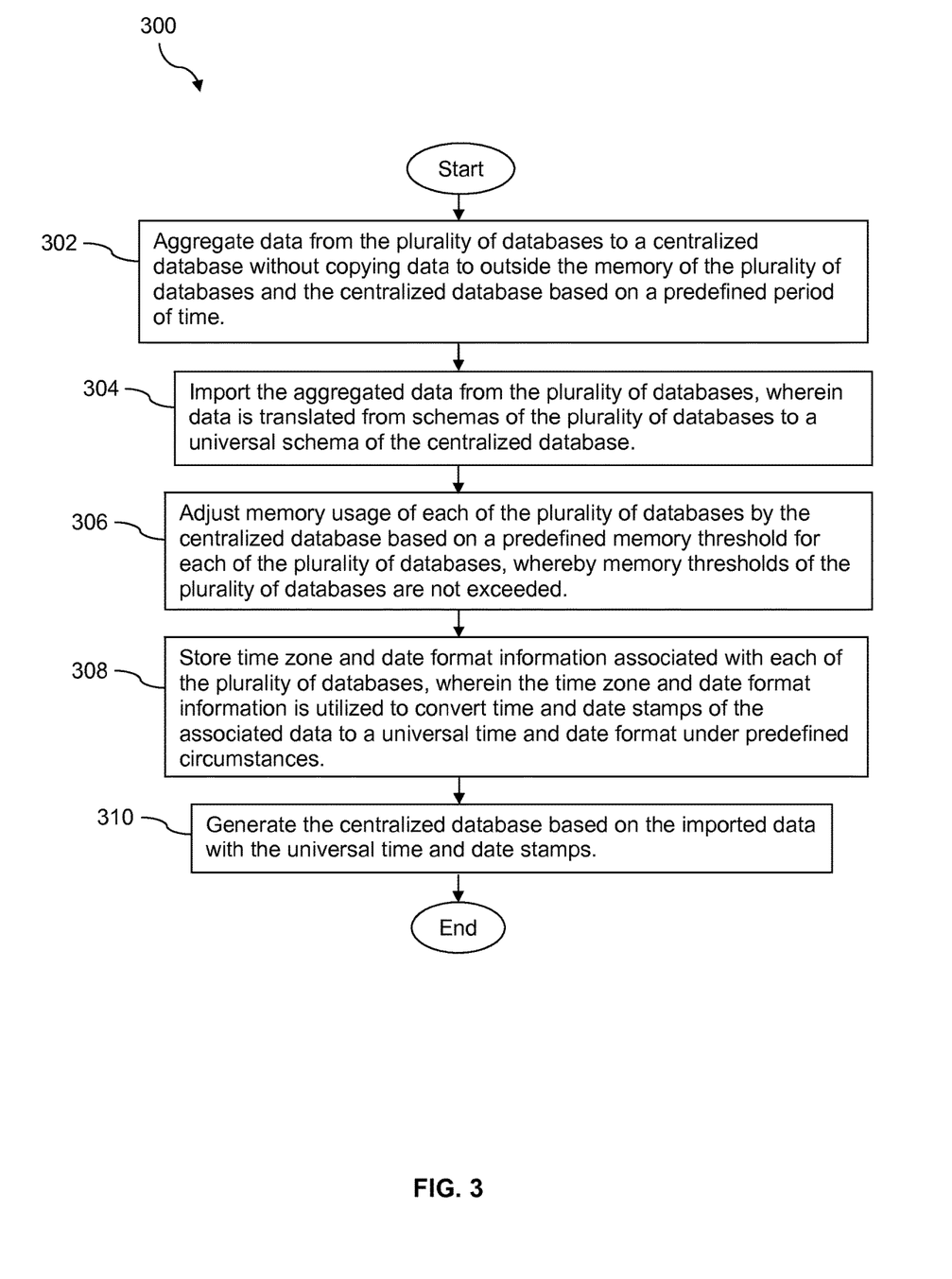
FIG. 3 is a flow chart illustrating another method according to an embodiment of the disclosure.

Turning now to FIG. 3, a method 300 is described. At block 302, data from the plurality of databases is aggregated to a centralized database without copying data to outside the memory of the plurality of databases and the centralized database based on a predefined period of time. For example, data from the plurality of databases 126-128 may be aggregated to the centralized database 112 without copying data to outside the memory of the plurality of databases 126-128 and the centralized database 112 based on a predefined period of time in the case where the data is configured to be aggregated based on time periods. At block 304, the aggregated data is imported from the plurality of databases 126-128, wherein data is translated from schemas of the plurality of databases 126-128 to a universal schema of the centralized database 112.

At block 306, memory usage of each of the plurality of databases 126-128 by the centralized database 112 is adjusted based on a predefined memory threshold for each of the plurality of databases 126-128, whereby memory thresholds of the plurality of databases 126-128 are not exceeded. At block 308, time zone and date format information associated with each of the plurality of databases 126-128 is stored, wherein the time zone and date format information is utilized to convert time and date stamps of the associated data to a universal time and date format under predefined circumstances. At block 310, the centralized database 112 is generated based on the imported data with the universal time and date stamps.

Figure 4:
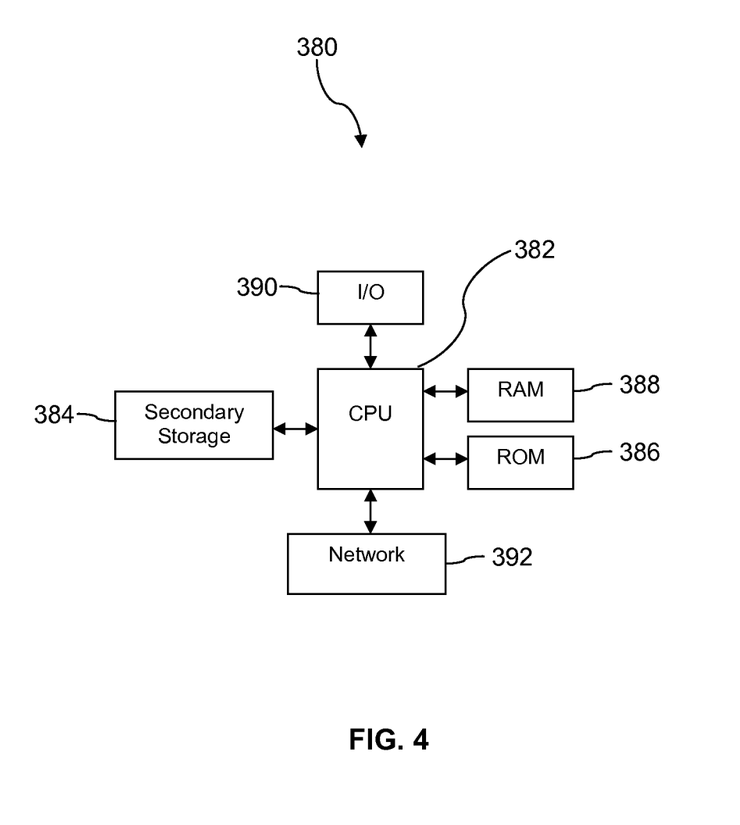
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method of importing data from a plurality of databases of various types, comprising:

aggregating data from each of the plurality of databases for a centralized database based on a predefined period of time, wherein the aggregating is performed by processing data in the memory of each of the plurality of databases directly without copying data to outside the memory of each of the plurality of databases;

importing the aggregated data from the plurality of databases, wherein data is translated from schemas of the plurality of databases to a universal schema of the centralized database;

adjusting memory usage of each of the plurality of databases by the centralized database based on a predefined memory threshold for each of the plurality of databases by adjusting the volume of data exported from each of the plurality of databases at a time, whereby memory thresholds of the plurality of databases are not exceeded;

storing time zone and date format information associated with each of the plurality of databases, wherein the time zone and date format information is utilized to convert time and date stamps of the associated data to a universal time and date format under predefined circumstances; and generating the centralized database based on the imported data with the universal time and date stamps.

2. The method of claim 1, further comprising, in response to running an automatic command, generating a configuration file for objects.

3. The method of claim 2, wherein the objects comprise at least one of a from database, a to database, a from table, and a to table.

4. The method of claim 1, further comprising determining a time automatically to aggregate data at a database.

5. The method of claim 1, wherein the various types of database comprises Mysql, PostgreSQL, MSSQL, and OracleDB.

6. The method of claim 1, further comprising automatically detecting a time zone and assuming a corresponding date format for each of the plurality of databases.

7. A system for importing data from a plurality of databases of various types, comprising:
a non-transitory memory;
a processor; and
an application stored in the memory that, when executed by the processor;
automatically decides a time to aggregate data at a database,
invokes application programming interfaces associated with the plurality of databases to aggregate data at the plurality of databases at determined times,
imports the aggregated data from the plurality of databases, wherein data is translated from schemas of the plurality of databases to a universal schema of a centralized database,
transmits queries to a first database among the plurality of databases for information on a first memory limit of the first database,
transmits queries to a second database among the plurality of databases for information on a second memory limit of the second database,
adjusts memory usage of the first database by adjusting the volume of data exported from the first database at a time, whereby the first memory limit of the first database is not exceeded,
adjusts memory usage of the second database by adjusting the volume of data exported from the second database at a time, whereby the second memory limit of the second database is not exceeded,
stores time zone and date format information associated with each of the plurality of databases, wherein the time zone and date format information is utilized to convert time and date stamps of the associated data to a universal time and date format under predefined circumstances, and
generates the centralized database based on the imported data with the universal time and date stamps.

8. The system of claim 7, wherein when an automatic command is run, the application generates a configuration file for objects.

9. The system of claim 8, wherein the objects comprise at least one of a from database, a to database, a from table, and a to table.

10. The system of claim 7, wherein the data is aggregated based on a column of the corresponding database.

11. The system of claim 7, wherein the schema translation is automatic and comprises worst case scenarios.

12. The system of claim 7, wherein the application determines a database type for each of the plurality of databases.

13. The system of claim 12, wherein the application determines available application programming interfaces based on the type of database.

14. A method of importing data from a plurality of databases of various types, comprising:
detecting a database type for each of the plurality of databases;
aggregating data at the plurality of databases based on the type of database and a predefined period of time;
importing the aggregated data from the plurality of databases, wherein data is translated from schemas of the plurality of databases to a universal schema of a centralized database;
transmitting queries to a first database among the plurality of databases for information on a first memory limit of the first database;
transmitting queries to a second database among the plurality of databases for information on a second memory limit of the second database;
adjusting memory usage of the first database by the centralized database by adjusting the volume of data exported from the first database at a time, whereby the first memory limit of the first database is not exceeded;
adjusting memory usage of the second database by the centralized database by adjusting the volume of data exported from the second database at a time, whereby the second memory limit of the second database is not exceeded; and
generating the centralized database based on the imported data.

15. The method of claim 14, further comprising automatically detecting a time zone and assuming a corresponding date format for each of the plurality of databases.

16. The method of claim 14, wherein an application determines available application programming interfaces associated with the plurality of databases based on the type of database.

17. The method of claim 16, wherein the various types of database comprise Mysql, PostgreSQL, MSSQL, and OracleDB.

18. The method of claim 14, further comprising determining a time automatically to aggregate data at a database.

19. The method of claim 14, further comprising, in response to running an automatic command, generating a configuration file for objects.

20. The method of claim 19, wherein the objects comprise at least one of a from database, a to database, a from table, and a to table.

* * * * *